United States Patent
Hwang et al.

(10) Patent No.: US 8,416,164 B2
(45) Date of Patent: Apr. 9, 2013

(54) LIQUID CRYSTAL DISPLAY DEVICE

(75) Inventors: Kwang Hee Hwang, Daegu-si (KR); Chan Won Lee, Daejeon-si (KR); Sung Hyun Cho, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1160 days.

(21) Appl. No.: 11/453,923

(22) Filed: Jun. 16, 2006

(65) Prior Publication Data

US 2007/0152943 A1 Jul. 5, 2007

(30) Foreign Application Priority Data

Dec. 29, 2005 (KR) .................. 10-2005-0132909

(51) Int. Cl.
  *G09G 3/36* (2006.01)
  *G02F 1/1343* (2006.01)
(52) U.S. Cl. ............ 345/87; 345/98; 345/103; 349/147; 349/148
(58) Field of Classification Search .................. 345/98, 345/87, 103; 349/143, 147–452
See application file for complete search history.

(56) References Cited

U.S. PATENT DOCUMENTS

| | | | | |
|---|---|---|---|---|
| 5,774,099 A | * | 6/1998 | Iwasaki et al. .................. 345/87 |
| 5,831,709 A | * | 11/1998 | Song ............................ 349/149 |
| 6,219,124 B1 | * | 4/2001 | Lee et al. ...................... 349/147 |
| 6,229,510 B1 | * | 5/2001 | Kim et al. ...................... 345/87 |
| 6,262,702 B1 | * | 7/2001 | Murade .......................... 345/87 |
| 6,392,626 B1 | | 5/2002 | Moon | |
| 2002/0044246 A1 | * | 4/2002 | Moon et al. .................... 349/141 |
| 2002/0093616 A1 | * | 7/2002 | Park et al. ..................... 349/149 |
| 2005/0139837 A1 | | 6/2005 | Lee et al. | |
| 2005/0156840 A1 | | 7/2005 | Kim et al. | |

FOREIGN PATENT DOCUMENTS

| | | |
|---|---|---|
| EP | 1 136 873 A2 | 9/2001 |
| JP | 05-210121 | 8/1993 |
| JP | 06-035002 | 2/1994 |
| JP | 07-218896 | 8/1995 |
| JP | 11-133379 | 5/1999 |
| JP | 2002-202493 | 7/2002 |
| JP | 2002-311451 | 10/2002 |
| JP | 2004-037956 | 2/2004 |
| KR | 10-2004-0061505 | 7/2004 |

* cited by examiner

*Primary Examiner* — Sumati Lefkowitz
*Assistant Examiner* — Jonathan Horner
(74) *Attorney, Agent, or Firm* — McKenna Long & Aldridge LLP

(57) ABSTRACT

A liquid crystal display device is provided. The liquid crystal display device includes: a lower substrate having a first and a second common voltage supplying line, pixel regions defined by a plurality of gate lines and a plurality of data lines and arranged in a matrix, and a plurality of common lines electrically connected to the second common voltage supplying line and arranged to be parallel to each of the gate lines; an upper substrate disposed to face the lower substrate and having a common electrode electrically connected to the first common voltage supplying line; a dot for electrically connecting the first common voltage supplying line and the common electrode; and a common voltage generator for generating a first and a second common voltage for independently supplying the first and the second common voltage to the first and the second common voltage supplying line.

31 Claims, 3 Drawing Sheets

LIQUID CRYSTAL DISPLAY DEVICE

This application claims the benefit of Korean Patent Application No. 10-2005-0132909, filed on Dec. 29, 2005, which is hereby incorporated by reference for all purposes as if fully set forth herein.

BACKGROUND OF THE INVENTION

1. Field of the Invention

The present invention relates to a liquid crystal display device, and more particularly, to a liquid crystal display device for providing reliable image quality.

2. Discussion of the Related Art

Today's information age demands various forms and types of display devices. In order to satisfy such an increasing demand, there is much ongoing research for developing flat panel display devices such as a liquid crystal display device (LCD), a plasma display panel (PDP) and an electro luminescent display (ELD). Some flat panel display devices have already been utilized in various types of equipment.

Among flat panel display devices, liquid crystal display devices (LCDs) are widely used as a mobile display device instead of using a cathode ray tube (CRT) display device because LCDs are lightweight, slim, and do not consume much power. LCDs are used as monitors for notebook computers and for televisions, for example.

Liquid crystal display devices display images by affecting light transmissivity by controlling the arrangement of liquid crystal molecules.

FIG. 1 is a schematic block diagram of a related art liquid crystal display device.

As shown in FIG. 1, the related art liquid crystal display device includes a liquid crystal panel 2 where a predetermined image is displayed, a PCB 4 disposed at one side of the liquid crystal panel 2, a plurality of data TCPs 10a to 10c interposed between the one side of the liquid crystal panel 2 and the PCB 4, a plurality of data driver ICs 12a to 12c embedded in corresponding data TCPs 10a through 10c, a plurality of gate TCPs 14a and 14b disposed at another side of the liquid crystal panel 2, and a plurality of gate driver ICs 16a and 16b embedded in corresponding gate TCPs 14a and 14b.

The PCB 4 includes various elements. For example, the PCB 4 may include a timing controller 6, a common voltage generator 8 and a power supply (not shown). The timing controller 6 generates a gate control signal for driving the gate driver ICs 16a and 16b and a data control signal for driving the data driver ICs 12a through 12c. The gate control signal is transmitted to the gate driver ICs 16a and 16b through a predetermined gate signal line (not shown). The data control signal is transmitted to the data driver ICs 12a through 12c through a predetermined data signal line (not shown). The common voltage generator 8 generates a predetermined level of a common voltage.

The liquid crystal panel 2 may include a lower substrate 1, an upper substrate 3 and liquid crystal interposed between the lower substrate 1 and the upper substrate 3. A plurality of gate lines GL1 to GLn and a plurality of data lines DL1 to DLm are formed on the lower substrate 1 and the gate and data lines intersect each other, and a thin film transistor (TFT) and a pixel electrode (not shown) are formed at the crossing of the gate lines GL1 to GLn and the data lines DL1 to DLm. Also, a plurality of common lines VL1 to VLn is formed to be parallel to a plurality of gate lines GL1 to GLn. The pixel electrode forms a storage capacitor Cst by overlapping with the common lines. The related art liquid crystal display device is called a storage on common mode. R, G and B color filters are arranged on the upper substrate 3 and a common electrode is formed on the R, G, B color filters.

The common voltage Vcom generated at the common voltage generator 8 is supplied to a first TCP line 17a and a second TCP line 17b. The first TCP line 17a is formed on the first data TCP 10a in a patterned shape and the second TCP line 17b is formed on the third data TCP 10c in a patterned shape.

A first to a fifth common voltage supplying line 18a to 18e are arranged at edge regions of the lower substrate 1. The first and the second common voltage supplying line 18a and 18b are arranged at a left edge region of the lower substrate 1, and the third and the fourth common voltage supplying line 18c and 18d are arranged at a right edge region of the lower substrate 1. The fifth common voltage supplying line 18e is arranged at a bottom edge region of the lower substrate 1. Furthermore, a silver (Ag) dot 22 is formed roughly at an edge region of the lower substrate 1 for transmitting a common voltage between the lower substrate 1 and the upper substrate 2.

The first TCP line 17a is commonly connected to the first and the second common voltage supplying lines 18a and 18b, and the second TCP line 17b is commonly connected to the third and the fourth common voltage supplying lines 18c and 18d.

The first, the third and the fifth common voltage supplying lines 18a, 18c and 18e are electrically connected to the Ag dot 22. That is, the first and the third common voltage supplying lines 18a and 18c pass a common voltage to a common electrode of the upper substrate 3 through the Ag dot 22. The second and the fourth common voltage supplying lines 18b and 18d are electrically connected to the common lines VL1 to VLn. Therefore, the second and the fourth common voltage supplying lines 18b and 18d transmit a common voltage to the common lines VL1 to VLn.

The common voltage Vcom generated at the common voltage generator 8 is supplied to a plurality of the Ag dots 22 and the first to the fourth common voltage supplying lines 18a to 18d through the first and the second TCP 17a and 17b. Accordingly, the common voltage Vcom is supplied not only to a plurality of common lines VL1 to VLn arranged on the lower substrate 1 but also to a common electrode (not shown) formed on the upper substrate 3. Therefore, the common voltage Vcom is supplied to a plurality of common lines VL1 to VLn for forming the storage capacitor Cst and to the common electrode of the upper substrate 3 through a plurality of the Ag dots 22.

The common voltage Vcom supplied to the common electrode is a driving voltage that drives liquid crystal injected between the upper substrate 3 and the lower substrate 1 with a data voltage supplied to a pixel electrode (not shown). A predetermined image is displayed on the liquid crystal panel 2 by driving the liquid crystal. In order to drive the liquid crystal, a constant common voltage Vcom must be supplied to the common electrode.

Since the liquid crystal panel 2 is of twisted nematic (TN) type and a storage on common structure, a plurality of common lines VL1 to VLn are arranged on the lower substrate 1. As described above, the common voltage Vcom generated at the common voltage generator 8 is supplied to a plurality of common lines VL1 to VLn.

The common voltage Vcom is supplied to the first to the fourth common voltage supplying lines 18a to 18d in an identical manner, a plurality of common lines VL1 to VLn, a plurality of the Ag dots 22 which are formed on the lower substrate 1 and to the common electrode formed on the upper substrate 3.

However, since the common electrode is formed on the entire surface of the upper substrate 3, the common electrode has a greater sheet resistance than a line resistance of the plurality of common lines VL1 to VLn formed on the lower substrate 1. Therefore, the common voltage Vcom generated from the common voltage generator 8 is supplied mostly to the plurality of common lines VL1 to VLn which have comparatively low resistance, and the common voltage Vcom is insufficiently supplied to the common electrode. That is, the common voltage is insufficiently supplied to the common electrode in the related art liquid crystal display device. Such an insufficient supply of the common voltage degrades image quality. Therefore, reliable image quality may not be obtained in the related art liquid crystal display device.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device for providing a quality reliable image by independently supplying different common voltages to a lower substrate and an upper substrate.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described, there is provided a liquid crystal display device compromising: a lower substrate having a first and a second common voltage supplying line, pixel regions defined by a plurality of gate lines and a plurality of data lines and said pixel regions arranged in a matrix, and a plurality of common lines electrically connected to the second common voltage supply line and arranged to be parallel to each of the gate lines; an upper substrate disposed to face the lower substrate and having a common electrode electrically connected to the first common voltage supply line; a dot that electrically connects the first common voltage supply line and the common electrode; and a common voltage generator that generates a first and a second common voltage for independently supplying the first and the second common voltage to the first and the second common voltage supply line.

In another aspect of the present invention, there is provided a liquid crystal display device compromising: a lower substrate having a first and a second common voltage supply line, pixel regions defined by a plurality of gate lines and a plurality of data lines and said pixel regions arranged in a matrix, and a plurality of common lines electrically connected to the second common voltage supply line and arranged to be parallel to each of the gate lines; an upper substrate disposed to face the lower substrate and having a common electrode electrically connected to the first common voltage supply line; a dot that electrically connects the first common voltage supply line and the common electrode; a common voltage generator that generates a first and a second common voltage for independently supplying the first and the second common voltage to the first and the second common voltage supply line; a first TCP connected to a first side of the lower substrate; and a second TCP connected to a second side of the lower substrate and electrically connected to the common voltage generator.

In a further aspect of the present invention, there is provided a liquid crystal display device compromising: a lower substrate having a first and a second common voltage supply line, pixel regions defined by a plurality of gate lines and a plurality of data lines and said pixel regions arranged in a matrix, and a plurality of common lines electrically connected to the second common voltage supply line and arranged to be parallel to each of the gate lines; an upper substrate disposed to face the lower substrate and having a common electrode electrically connected to the first common voltage supply line; a dot that electrically connects the first common voltage supply line and the common electrode; a common voltage generator that generates a first and a second common voltage for independently supplying the first and the second common voltage to the first and the second common voltage supply line; a first and a second TCP connected to a first and a second side of the lower substrate, respectively, which face one another; and a third TCP connected to a third side of the lower substrate and electrically connected to the common voltage generator.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings. Wherever possible, the same reference numbers will be used throughout the drawings to refer to the same or like parts.

Figure 1:
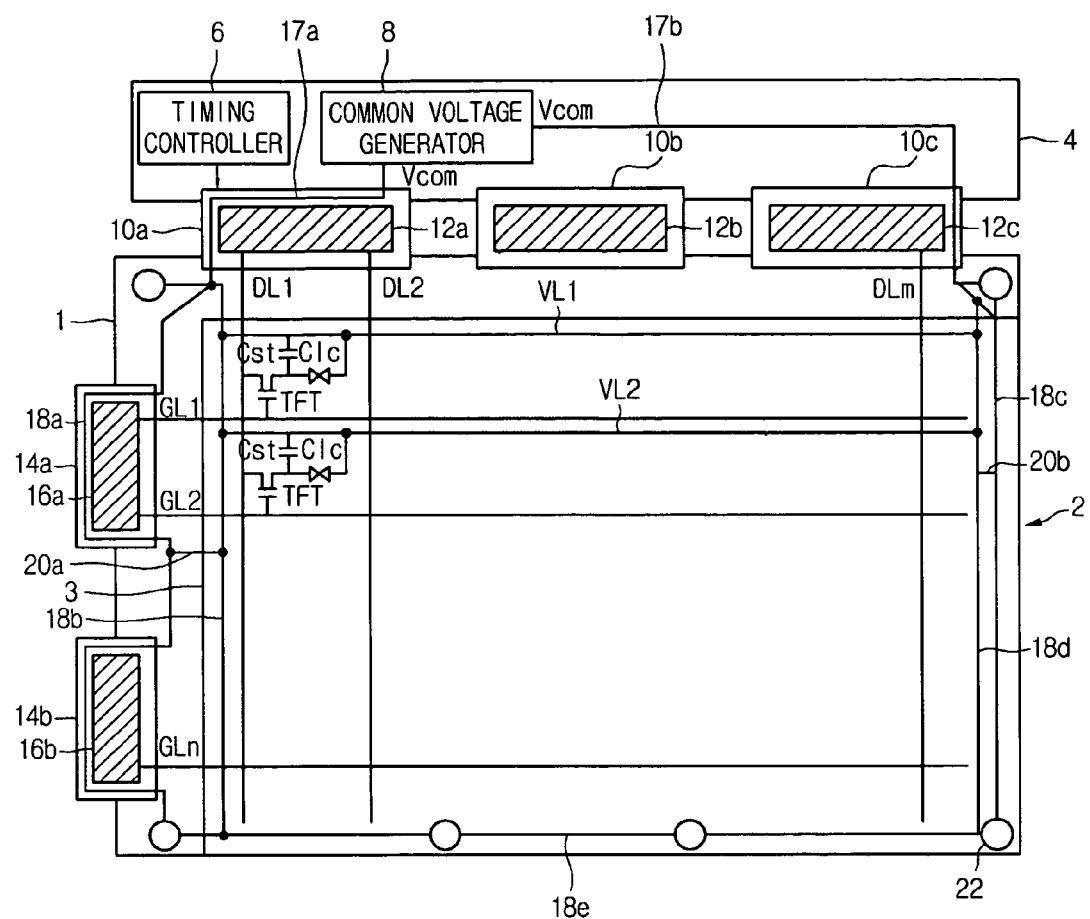
FIG. 1 is a schematic diagram of a related art liquid crystal display device.
Figure 2:
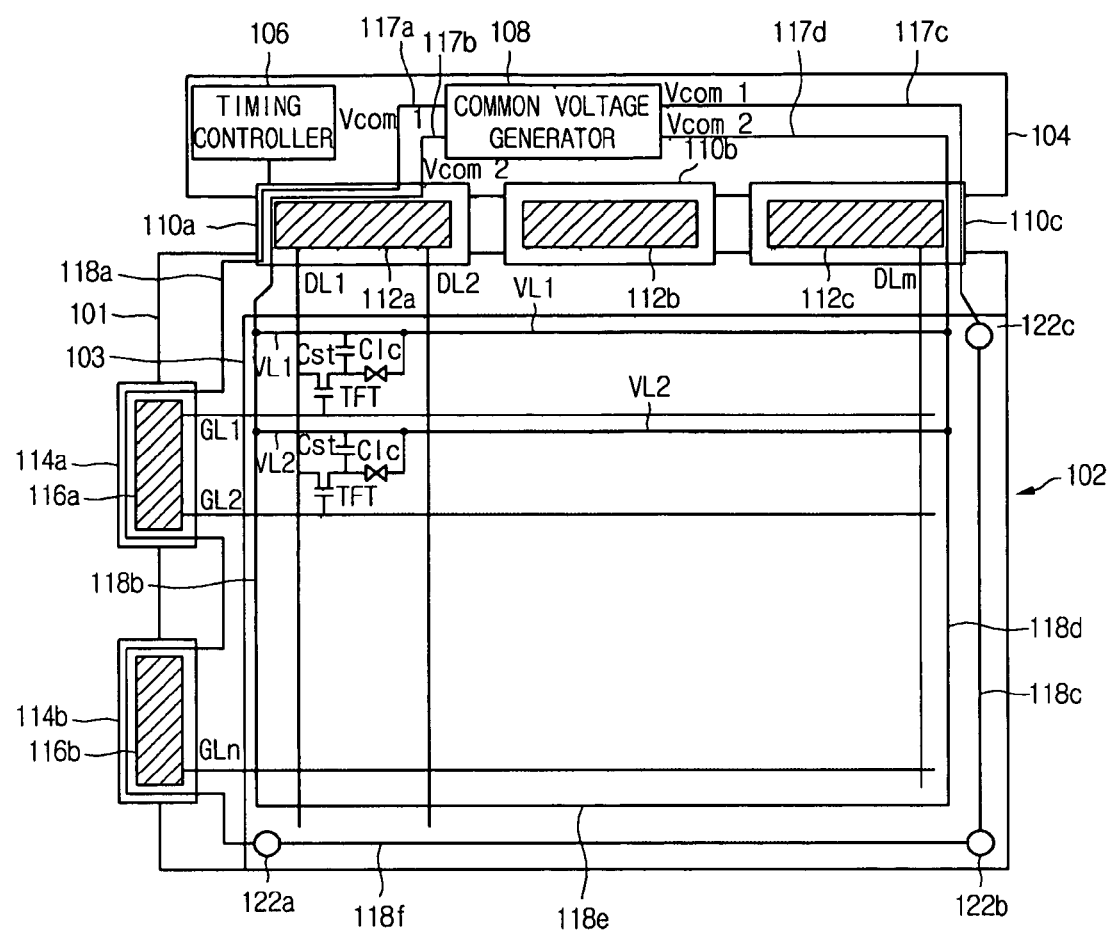
FIG. 2 is a schematic diagram of a liquid crystal display device according to an embodiment of the present invention.

FIG. 2 is a schematic diagram of a liquid crystal display device according to a first embodiment of the present invention.

As shown in FIG. 2, the liquid crystal display device according to an embodiment comprises a liquid crystal panel 102 having a plurality of gate lines GL1 to GLn, a plurality of data lines DL1 to DLm and a plurality of common lines VL1 to VLn which are arranged thereon for display a predetermined image, a PCB 104 disposed at a one side of the liquid crystal panel 102, a plurality of data TCPs 110a to 110c disposed between the liquid crystal panel 102 and the PCB 104, a plurality of gate TCPs 114a and 114b connected at another side of the liquid crystal panel 102, a plurality of data driver ICs 112a to 112c embedded in corresponding data TCPs 110a to 110c, and a plurality of gate driver ICs 116a and 116b embedded in corresponding gate TCPs 114a and 114b.

The PCB 104 includes various elements. For example, the PCB 104 includes a timing controller 106, a common voltage generator 108 and a power supply (not shown). The timing controller 106 generates a gate control signal for controlling the gate driver ICs 116a and 116b and a data control signal for controlling the data driver ICs 112a to 112c. The gate control signal is supplied to the gate driver ICs 116a and 116b through a gate signal line (not shown). The data control signal is supplied to the data driver ICs 112a to 112c through a data signal line (not shown). The common voltage generator 8 generates a predetermined level of common voltage.

The liquid crystal panel 102 includes a lower substrate 101, an upper substrate 103 and liquid crystal interposed between the lower substrate 101 and the upper substrate 103. A plurality of gate lines GL1 to GLn and a plurality of data lines DL1 to DLm intersect on the lower substrate 101, and a thin film transistor (TFT) and a pixel electrode (not shown) are formed at the crossings of the gate lines and the data lines. Also, a plurality of common lines VL1 to VLn are formed substantially in parallel to a plurality of the gate lines GL1 to GLn. The pixel electrode forms a storage capacitor Cst by overlapping with a previous common line. This is known as a storage on common mode. R, G and B color filters are arranged on the upper substrate 103 and a common electrode may be formed on the R, G and B color filters.

A common voltage generated at the common voltage generator 108 may be supplied to a liquid crystal panel 102 through a first to a fourth TCP lines 117a to 117d. The first to the fourth TCP lines 117a to 117d are formed near the left data TCP, that is, the first data TCP 110a, and on the most right data TCP 110c, that is, the fourth data TCP 110c in a patterned shape. In other words, the first TCP line 117a and the second TCP line 117b are formed on the first data TCP 110a, and the third TCP line 117c and the fourth TCP line 117d are formed on the data TCP 110.

A first to a fifth common voltage supply line 118a to 118e are arranged on the lower substrate 101 of the liquid crystal panel 102. The first and the second common voltage supply lines 118a and 118b are arranged near a left side edge region of the lower substrate 101. The third and the fourth common voltage supply lines 118c and 118d are arranged near a right side edge region of the lower substrate 101. The fifth common voltage supply line 118e is arranged near a bottom edge region of the lower substrate 101. The first to the fourth common voltage supply lines 118a to 118d are arranged substantially in parallel to the data lines DL1 to DLm, and the fifth common voltage supply line 118e is arranged substantially in parallel to the gate lines GL1 to GLn. The first common voltage supply line 118a is electrically connected to the first TCP line 117a, and the second common voltage supply line 118b is electrically connected to the second TCP line 117b. The third common voltage supply line 118c is electrically connected to the third TCP line 117c and the fourth common voltage supply line 118d is electrically connected to the fourth TCP line 117d. Also, both ends of the fifth common voltage supply line 118e are electrically connected to the first and the third common voltage supply lines 118a and 118c, respectively. The first common voltage supply line 118a is formed on the gate TCP 114a and 114b as well as near the left side edge region of the lower substrate 101. The second and the fourth common voltage supply lines 118b and 118d are electrically connected to the common lines VL1 to VLn. Furthermore, a plurality of Ag dots 122a to 122c are substantially between the common voltage supply lines 118a to 118e, between the first TCP line 117a and the first common voltage supply line 118a, and between the third TCP line 117c and the third common voltage supply line 118c in order to supply the common voltage to the upper substrate 103 through the lower substrate 101. The Ag dots 122a to 122c may be formed on each of the common voltage supply lines 118a to 118e. Therefore, the Ag dots 122a to 122c electrically connect each of the common voltage supply lines 118a to 118e of the lower substrate 101 with a common electrode of the upper substrate 103.

The common voltage generator 108 generates a first common voltage Vcom1 and a second common voltage Vcom2 of different values. The first common voltage Vcom1 is supplied to the first TCP line 117a arranged on the first data TCP 110a and to the third TCP line 117c arranged on the third data TCP 110c. The second common voltage Vcom2 is supplied to a second TCP line 117b arranged on the first data TCP 110a and to a fourth TCP line 117d arranged on the third data TCP 110c. Then, the first common voltage supplied to the first and the third TCP line 117a and 117c is supplied to the common electrode of the upper substrate 103 through the first and the third common voltage supply lines 118a and 118c and the Ag dots 122a to 112c. The first common voltage Vcom1 may be supplied to the fifth common voltage supply line 118e. The second common voltage Vcom2 is supplied to the common lines VL1 to VLn through the second and the fourth common voltage supply lines 118b and 118d. Therefore, a voltage difference between the second common voltage supplied to the common lines VL1 to VLn of the lower substrate 101 and a data voltage supplied to a pixel electrode is stored at the storage capacitor Cst. The first common voltage Vcom1 supplied to the common electrode of the upper substrate 103 is a reference voltage for displaying an image. Therefore, the image is displayed by the potential difference between the first common voltage Vcom1 and the data voltage supplied to the pixel electrode of each pixel region. The data voltage supplied to a pixel electrode may be charged at the storage capacitor formed between the common lines VL1 to VLn and the pixel electrode by the second common voltage Vcom2.

Therefore, the first common voltage Vcom1 is supplied to the common electrode of the upper substrate 103, and the second common voltage Vcom2 is supplied to the common lines VL1 to VLn of the lower substrate 101. As described above, one of the shortcomings of the related art liquid crystal display device, that is, insufficient supply of the common voltage to the common electrode of the upper substrate due to a resistance difference between the line resistance of the common line of the lower substrate and the sheet resistance of the common electrode of the upper substrate, may be overcome by supplying the first common voltage Vcom1 and the second common voltage Vcom2 of different values to the common electrode of the upper substrate 103 and the common lines VL1 to VLn of the lower substrate 101.

That is, the first common voltage Vcom1 supplied to the common electrode of the upper substrate 103 may be set to be at least greater than the second common voltage Vcom2 supplied to the common lines VL1 to VLn of the lower substrate 101. Herein, the voltage level of the first common voltage Vcom1 may be decided according to a resistance difference between the sheet resistance of the common electrode of the upper substrate 103 and the line resistance of the common lines VL1 to VLn of the lower substrate 101. The first common voltage Vcom1 may be set to be comparatively greater that the second common voltage Vcom2 in proportional to the resistance difference between the line resistance and the sheet resistance.

In an exemplary embodiment, the first and the second common voltage Vcom1 and Vcom2 which have different values are independently supplied to the common electrode of the upper substrate 103 and the common lines VL1 to VLn of the lower substrate 101 in order to stably and sufficiently supply the common voltage to the common electrode. Therefore, the liquid crystal display device according to an embodiment prevents image quality from being degraded by stably and sufficiently supplying a voltage to the common electrode of the upper substrate 103.

In an embodiment, the gate lines GL1 to GLn of the liquid crystal panel 102 are driven by the gate driver ICs 116a and 116b of the gate TCPs 114a and 114b which are disposed near one side of the liquid crystal panel 102.

However, the present invention is not limited thereby. The present invention may be applied to a structure for driving the gate lines GL 1 to GLn of a liquid crystal panel 102 from both sides of the liquid crystal panel 102. Such a structure will be described hereinafter.

Figure 3:
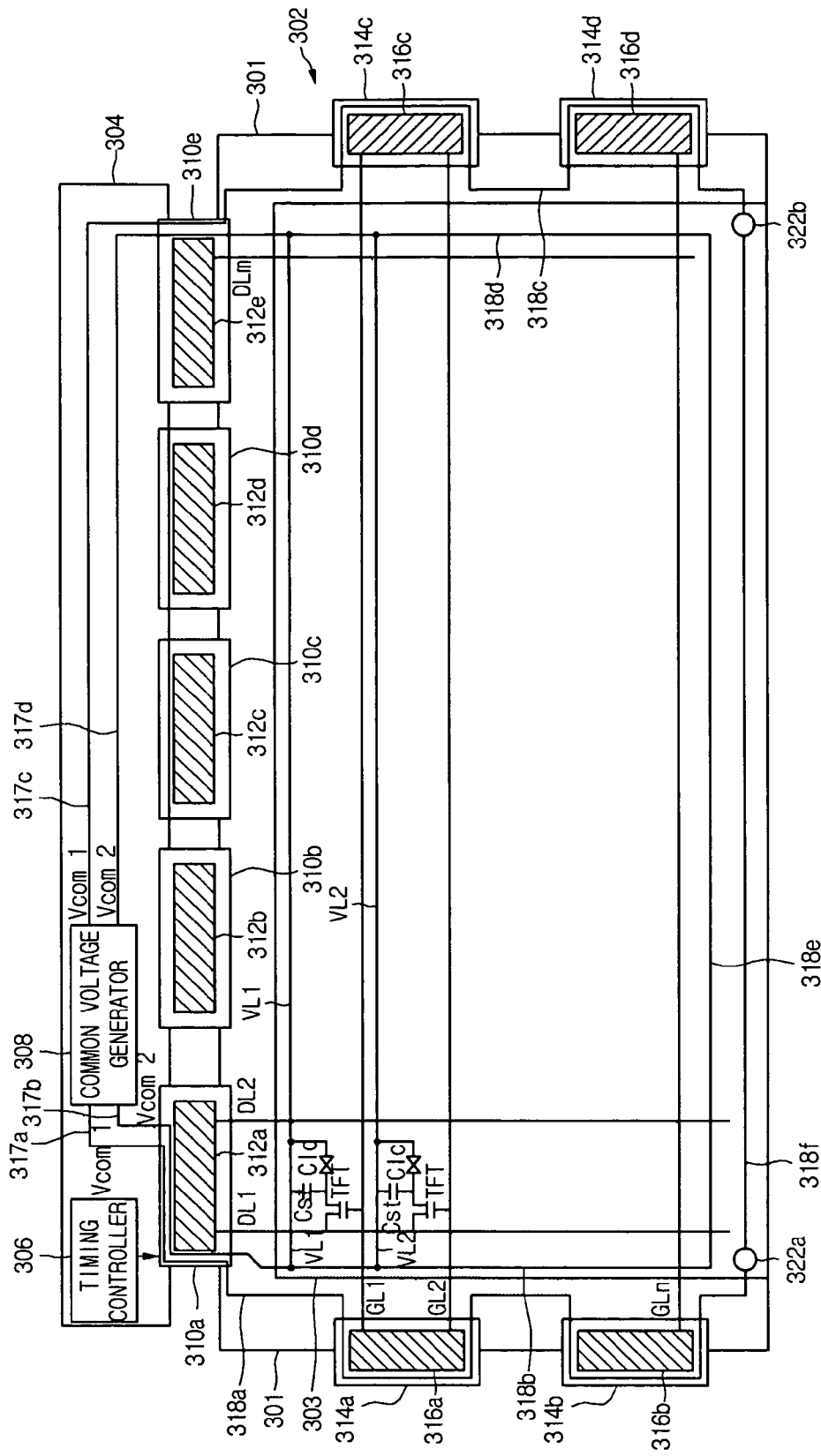
FIG. 3 is a schematic diagram of a liquid crystal display device according to an embodiment of the present invention.

FIG. 3 is a schematic diagram of a liquid crystal display device according to an embodiment of the present invention.

As shown in FIG. 3, the liquid crystal display device according to an embodiment basically has a similar configuration when compared to that of the other embodiment. The liquid crystal display device according to an embodiment comprises a first and a second gate TCP 314a and 314b arranged near a left side of a lower substrate 301 and a third and a fourth TCP 314c and 314d arranged near a right side of the lower substrate 301. A first to a fourth gate driver IC 316a to 316d are embedded into the first to the fourth gate TCP 314a to 314d, respectively.

The liquid crystal display device according to an embodiment includes a PCB 304, a plurality of gate TCPs 314a to 314d, a plurality of data TCPs 310a to 310e and a liquid crystal panel 302.

The PCB 304 is arranged near an upper portion of the liquid crystal panel 302. The PCB 304 includes a timing controller 306, a common voltage generator 308 and a power supply (not shown).

The data TCPs 310a to 310e are interposed between the PCB 304 and the liquid crystal panel 302. A first to a fifth data driver IC 312a to 312e are embedded in the data TCPs 310a to 310e. A first to a fourth TCP line 317a to 317d are arranged near some of the data TCPs, the first to the fifth data TCPs 310a to 310e. That is, the first and the second TCP line 317a and 317b are arranged near the first data TCP 310a, and the third and the fourth TCP line 317c and 317d are arranged near the fifth data TCP 310e. The data driver ICs 312a to 312e supply a predetermined level of data voltage to the liquid crystal panel 302 in response to a control signal generated from the timing controller 306.

The gate TCPs 314a to 314d are arranged near a left side and a right side of the liquid crystal panel 302. That is, the first and the second gate TCP 314a and 314b are connected to the liquid crystal panel 302 near the left side of the liquid crystal panel 302. The third and the fourth gate TCP 314c and 314d are connected to the liquid crystal panel 302 near the right side of the liquid crystal panel 302. A first to a fourth gate driver ICs 316a to 316d are embedded on the first to the fourth gate TCPs 314a to 314d. The first to the fourth gate driver ICs 314a to 314d sequentially supply a scan signal to the liquid crystal panel 302 in response to a gate control signal generated from the timing controller 306 of the PCB 304. As described above, the first to the fourth gate driver ICs 316a to 316d are disposed near the left side and the right side of the liquid crystal panel 302, and the scan signals are supplied to both sides of the liquid crystal panel 302. Therefore, image quality degradation is prevented by compensating a dropped voltage caused by a line resistance.

The liquid crystal panel 302 further comprises a lower substrate 301, an upper substrate 303 and liquid crystal interposed between the lower substrate 301 and the upper substrate 303. A plurality of gate lines GL1 to GLn and a plurality of data lines DL1 to DLm cross each other on the lower substrate 301 defining a pixel region. A plurality of common lines VL1 to VLn are arranged in parallel to a plurality of gate lines GL1 to GLn. A thin film transistor (TFT), a switching element, is disposed at the crossing of the gate lines GL1 to GLn and the data lines DL1 to DLm. The TFT is connected to a pixel electrode (not shown). The pixel electrode forms a storage capacitor Cst by overlapping with a plurality of the common lines VL1 and VL2. The storage capacitor Cst maintains a data voltage supplied to the pixel electrode for one frame. A first to a fifth common voltage supply lines 318a to 318e are arranged approximately along an edge region of the lower substrate 301. The first and the second common voltage supply lines 318a and 318b are arranged near a left side edge region of the lower substrate 301, and the third and the fourth common voltage supply lines 318c and 318d are arranged near a right side edge region of the lower substrate 303. The fifth common voltage supply line 318e is arranged near a bottom edge region of the lower substrate 303.

Red, Green, and Blue (R, G, B) color filters and a common electrode may be formed on the upper substrate 303. Ag dots 322a and 322b are formed between the upper substrate 303 and the lower substrate 301 in order to transfer a common voltage from the lower substrate 301 to the upper substrate 303. In more detail, the Ag dots 322a and 322b electrically connect the common voltage supply lines 318a to 318e of the lower substrate 301 to the common electrode of the upper substrate 303. More Ag dots than illustrated in the Figures may be incorporated into the invention as needed. Furthermore, the location of the Ag dots may vary as needed.

The liquid crystal panel 302 is of a twisted nematic (TN) mode and a storage on common mode. That is, the liquid crystal panel 302 is the TN mode that twists the liquid crystal using the potential difference between the data voltage supplied to the pixel electrode formed on the lower substrate 301 and the common voltage supplied to the common electrode formed on the upper substrate 303. Also, the liquid crystal panel 302 is the storage on common mode that charges the pixel electrode with the data voltage to be maintained for one frame.

As described above, different common voltages are independently supplied to the common lines VL1 to VLn of the lower substrate 301 and the common electrode of the upper substrate 303 in order to compensate for sheet resistance of the common electrode that is comparatively greater than the line resistance of the common line. Therefore, the common voltage is stably and sufficiently supplied to the common electrode of the upper substrate 303 and image quality degradation is prevented according to an embodiment of the present invention.

The common voltage generator 308 generates a first and a second common voltage Vcom1 and Vcom2 which have different voltage values. The first common voltage Vcom1 is supplied to the first TCP line 317a arranged near the first data TCP 310a and to the third TCP line 217c arranged near the fifth data TCP 310e. The second common voltage Vcom2 is supplied to a second TCP line 317b arranged near the first data TCP 310a and to a fourth TCP line 317d arranged near the fifth data TCP 310e. Therefore, the first common voltage Vcom1 supplied to the first and the third TCP line 317a and 317c is supplied to the common electrode of the upper substrate 303 through the first and the third common voltage supply line 318a and 318c and the Ag dots 322a and 322b.

The first common voltage Vcom1 may be supplied to the fifth common voltage supply line 318e. The first common voltage supply line 318a is formed not only near a left side edge region of the lower substrate 301 but also near the first and the second gate TCP 114a and 114b. The third common voltage supply line 318c is formed near the third and the fourth gate TCP 314c and 314d as well as near the right side edge region of the lower substrate 301. The second common voltage Vcom2 is supplied to the common lines VL1 to VLn through the second and the fourth common voltage supply lines 318b and 318d. Therefore, the second common voltage Vcom2 supplied to the common lines VL1 to VLn of the lower substrate 301 is a voltage for forming a storage capacitor Cst between a pixel electrode and the common lines, and the first common voltage supplied to the common electrode of the upper substrate 303 is a reference voltage for displaying an image. Therefore, an image is displayed by the potential difference between the first common voltage Vcom1 and the data voltage supplied to a pixel electrode of each pixel region, and the data voltage supplied to the pixel electrode is charged at the storage capacitor formed between the common lines VL1 to VLn and the pixel electrode by the second common voltage Vcom2.

As described above, the first common voltage Vcom1 is supplied to the common electrode of the upper substrate 303 and the second common voltage Vcom2 is supplied to the common lines VL1 to VLn of the lower substrate 301, independently. The first and the second common voltage Vcom1 and Vcom2 which are of different voltage values are supplied to the common electrode of the upper substrate 303 and to the common lines VL1 to VLn of the lower substrate 301. Therefore, one of the shortcomings of the related art LCD, unstable and insufficient supply of a common voltage to a common electrode of an upper substrate, caused by a difference between a line resistance of a common line of a lower substrate and a sheet resistance of a common electrode of an upper substrate, may be solved according to an embodiment of the present invention.

That is, the first common voltage Vcom1 supplied to the common electrode of the upper substrate 303 may be set to be at least greater than the second common voltage Vcom2 supplied to the common lines VL1 to VLn of the lower substrate 301. Herein, the voltage level of the first common voltage Vcom1 may be decided according to a resistance difference between the sheet resistance of the common electrode of the upper substrate 303 and the line resistance of the common lines VL1 to VLn of the lower substrate 301. The first common voltage Vcom1 may be set to be comparatively greater that the second common voltage Vcom2 in proportion to the resistance difference between the common lines' line resistance and the common electrode sheet resistance.

In the liquid crystal display device according to an embodiment, the first and the second common voltages Vcom1 and Vcom2 having different values are independently supplied to the common lines VL1 to VLn of the lower substrate 301 and to the common electrode of the upper substrate 303. Therefore, image quality degradation is prevented by stably and sufficiently supplying the common voltage to the common electrode of the upper substrate 303.

In an embodiment of the present invention, the gate line is driven from near the left and the right sides of the liquid crystal panel. However, the present invention is not limited by such a structure of driving the gate line. The present invention may be applied to a structure of driving the gate line from near the top and the bottom sides of the liquid crystal panel.

As described above, the common voltage Vcom is stably and sufficiently supplied to the upper substrate and the lower substrate by independently supplying the common voltage Vcom to the upper substrate and the lower substrate in the liquid crystal display device according to the present invention. Therefore, an image quality thereof is improved.

The disclosed technique of independently supplying a common voltage to an upper substrate and a lower substrate may be applied to a structure of driving a gate line from one side, a structure of driving a gate line from both sides, and a structure of driving a data line from both sides. Other variations and modifications are also possible.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:
1. A liquid crystal display device comprising:
a lower substrate having a first and a second common voltage supply lines, pixel regions defined by a plurality of gate lines and a plurality of data lines and said pixel regions arranged in a matrix, and a plurality of common lines electrically connected to the second common voltage supply line and substantially parallel to each of the gate lines;
an upper substrate disposed to face the lower substrate and having a common electrode electrically connected to the first common voltage supply line;
a plurality of dots that electrically connect the first common voltage supply line and the common electrode; and
a common voltage generator that generates a first and a second common voltage for independently supplying the first and the second common voltage to the first and the second common voltage supply lines,
wherein the first common voltage supply line is electrically isolated from and disconnected to the second common voltage supply line,
wherein the first and second common voltage supply lines are arranged substantially parallel to each of the data lines,
wherein the first common voltage supply line is electrically connected to the common electrode of the upper substrate via the plurality of dots, and the second common voltage supply line is electrically connected to the common line of the lower substrate,
wherein the first common voltage is supplied to the common electrode of the upper substrate through the first common voltage supply line and the plurality of dots, and the second common voltage is supplied to the common line of the lower substrate through the second common voltage supply lines, and
wherein the first common voltage supplied to the common electrode is at least greater than the second common voltage supplied to the common lines in proportion to a difference between a line resistance of the common line of the lower substrate and a sheet resistance of the common electrode of the upper substrate.

2. The liquid crystal display device according to claim 1, wherein a storage capacitor is formed by overlapping a pixel electrode arranged at the pixel region and the common line.

3. The liquid crystal display device according to claim 2, wherein the storage capacitor stores a voltage difference between the second common voltage and a data voltage supplied to the pixel electrode.

4. The liquid crystal display device according to claim 1, wherein the first common voltage is a reference voltage to display an image.

5. The liquid crystal display device according to claim 1, wherein the first and the second common voltage supply lines are arranged near an edge region of the lower substrate.

6. The liquid crystal display device according to claim 1, wherein the dot is formed substantially between the first common voltage supply lines.

7. The liquid crystal display device according to claim 1, wherein the dot is formed near the first common voltage supply line.

8. The liquid crystal display device according to claim 1, wherein the first common voltage has a value different from that of the second common voltage.

9. The liquid crystal display device according to claim 1, wherein the first and the second common voltage are selected according to the line resistance of the common line and the sheet resistance of the common electrode.

10. A liquid crystal display device comprising:
a lower substrate having a first and a second common voltage supply lines, pixel regions defined by a plurality of gate lines and a plurality of data lines and said pixel regions arranged in a matrix, and a plurality of common lines electrically connected to the second common voltage supply line and substantially parallel to each of the gate lines;
an upper substrate disposed to face the lower substrate and having a common electrode electrically connected to the first common voltage supplying line;
a plurality of dots that electrically connect the first common voltage supply line and the common electrode;
a common voltage generator that generates a first and a second common voltage for independently supplying the first and the second common voltage to the first and the second common voltage supply lines;
a first gate TCP connected to a first side of the lower substrate; and
a second gate TCP connected to a second side of the lower substrate and electrically connected to the common voltage generator,
wherein the first common voltage supply line is electrically isolated from and disconnected to the second common voltage line,
wherein the first common voltage supply line is electrically connected to the common electrode of the upper substrate via the plurality of dots, and the second common voltage supply line is electrically connected to the common line of the lower substrate and the plurality of dots, and the second common voltage is supplied to the common line of the lower substrate through the second common voltage supply lines, and
wherein the first common voltage supplied to the common electrode is at least greater than the second common voltage supplied to the common lines in proportion to a difference between a line resistance of the common line of the lower substrate and a sheet resistance of the common electrode of the upper substrate.

11. The liquid crystal display device according to claim 10, wherein the first and the second common voltage supply line are arranged near an edge region of the lower substrate.

12. The liquid crystal display device according to claim 10, wherein the dot is substantially between the first common voltage supplying lines.

13. The liquid crystal display device according to claim 10, wherein the dot is formed near the first common voltage supply line.

14. The liquid crystal display device according to claim 10, wherein the first common voltage has a different value from that of the second common voltage.

15. The liquid crystal display device according to claim 10, wherein the first and the second common voltage are selected according to the line resistance of the common line and the sheet resistance of the common electrode.

16. The liquid crystal display device according to claim 10, wherein the first common voltage supply line is formed near an edge region of the lower substrate and the first gate TCP.

17. The liquid crystal display device according to claim 10, wherein a driver TCP is embedded at each of the first and the second gate TCP.

18. A liquid crystal display device comprising:
a lower substrate having a first and a second common voltage supply lines, pixel regions defined by a plurality of gate lines and a plurality of data lines and said pixel regions arranged in a matrix, and a plurality of common lines electrically connected to the second common voltage supply line and substantially parallel to each of the gate lines;
an upper substrate disposed to face the lower substrate and having a common electrode electrically connected to the first common voltage supply line;
a plurality of dots that electrically connect the first common voltage supply line and the common electrode;
a common voltage generator that generates a first and a second common voltage for independently supplying the first and the second common voltage to the first and the second common voltage supply lines;
a first and a second gate TCP connected to a first and a second side of the lower substrate, respectively, which face one another; and
a third gate TCP connected to a third side of the lower substrate and electrically connected to the common voltage generator,
wherein the first common voltage supply line is electrically isolated from and disconnected to the second common voltage line,
wherein the first common voltage supply line is electrically connected to the common electrode of the upper substrate via the plurality of dots, and the second common voltage supply line is electrically connected to the common line of the lower substrate,
wherein the first common voltage is supplied to the common electrode of the upper substrate through the first common voltage supply line and the plurality of dots, and the second common voltage is supplied to the common line of the lower substrate through the second common voltage supply lines, and
wherein the first common voltage supplied to the common electrode is at least greater than the second common voltage supplied to the common lines in proportion to a difference between a line resistance of the common line of the lower substrate and a sheet resistance of the common electrode of the upper substrate.

19. The liquid crystal display device according to claim 18, wherein the first and the second common voltage supply line are arranged near an edge region of the lower substrate.

20. The liquid crystal display device according to claim 18, wherein the dot is substantially between the first common voltage supplying lines.

21. The liquid crystal display device according to claim 18, wherein the dot is formed near the first common voltage supplying line.

22. The liquid crystal display device according to claim 18, wherein the first common voltage has a different value from that of the second common voltage.

23. The liquid crystal display device according to claim 18, wherein the first and the second common voltage are selected according to the line resistance of the common line and the sheet resistance of the common electrode.

24. The liquid crystal display device according to claim 18, wherein the first common voltage supply line is formed near an edge region of the lower substrate and the first and the second gate TCP.

25. The liquid crystal display device according to claim 18, wherein a driver TCP is embedded at each of the first to the third gate TCP.

26. The liquid crystal display device according to claim 1, wherein the first common voltage supply line is electrically connected to a first and a third TCP lines, wherein the second common voltage supply line is electrically connected to contacted to a second and a fourth TCP lines, wherein the first and second TCP lines are formed on a first data TCP of a left side edge region of the lower substrate, wherein the third and fourth TCP lines are formed on a second data TCP of a right edge region of the lower substrate.

27. The liquid crystal display device according to claim 10, wherein the first common voltage supply line is electrically connected to a first and a third TCP lines, wherein the second common voltage supply line is electrically connected to a second and a fourth TCP lines, wherein the first and second TCP lines are formed on a first data TCP of a left side edge region of the lower substrate, wherein the third and fourth TCP lines are formed on a second data TCP of a right edge region of the lower substrate.

28. The liquid crystal display device according to claim 18, wherein the first common voltage supply line is electrically connected to a first and a third TCP lines, wherein the second common voltage supply line is electrically connected to a second and a fourth TCP lines, wherein the first and second TCP lines are formed on a first data TCP of a left side edge region of the lower substrate, wherein the third and fourth TCP lines are formed on a second data TCP of a right edge region of the lower substrate.

29. The liquid crystal display device according to claim 1, wherein the second common voltage supply line is formed along an edge region of the lower substrate, and the first common voltage supply line is formed to surround the second common voltage supply line.

30. The liquid crystal display device according to claim 10, wherein the second common voltage supply line is formed along an edge region of the lower substrate, and the first common voltage supply line is formed to surround the second common voltage supply line.

31. The liquid crystal display device according to claim 18, wherein the second common voltage supply line is formed along an edge region of the lower substrate, and the first common voltage supply line is formed to surround the second common voltage supply line.

\* \* \* \* \*